June 20, 1961
B. R. SHEAFFER
2,989,272
AIRCRAFT TAIL HOOK ASSEMBLY
Filed Nov. 19, 1958
5 Sheets-Sheet 1
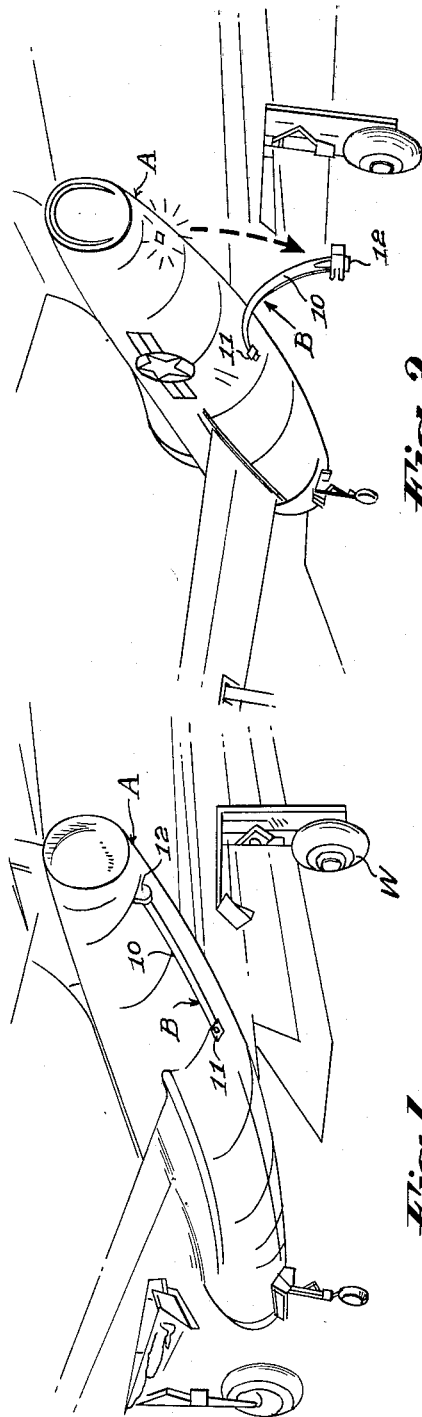
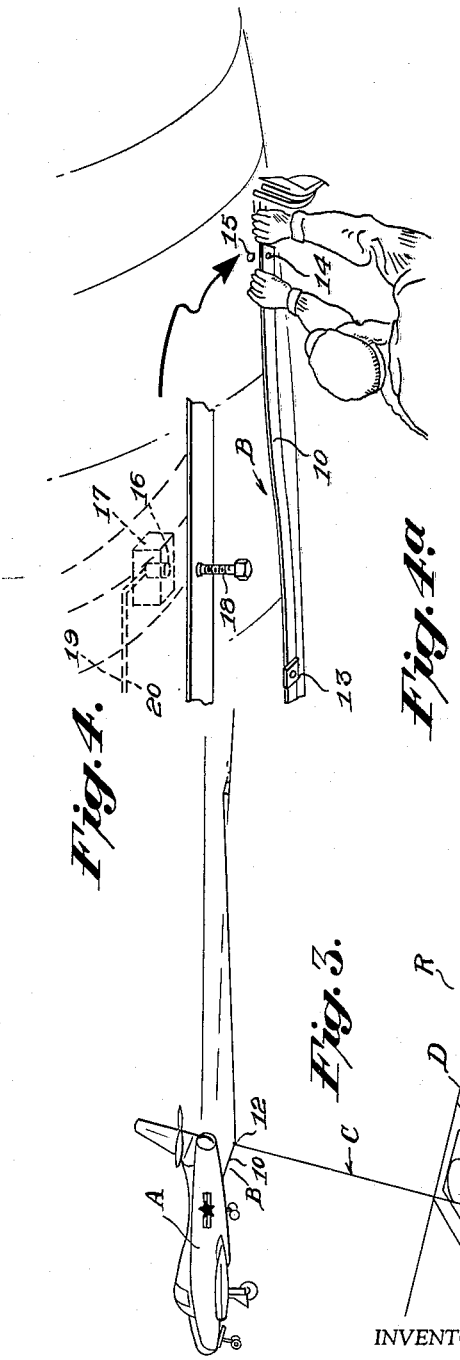
INVENTOR.
Bruce R. Sheaffer
BY
Herbert M. Birch

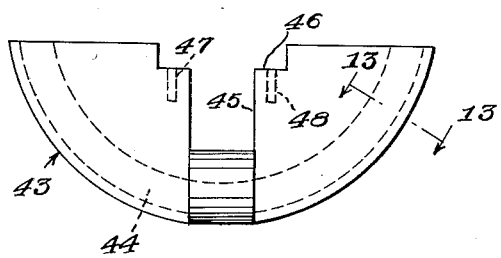
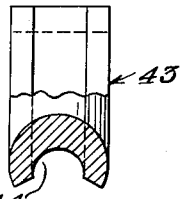
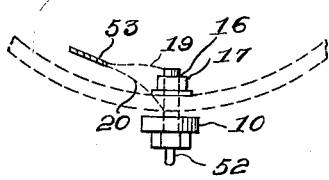
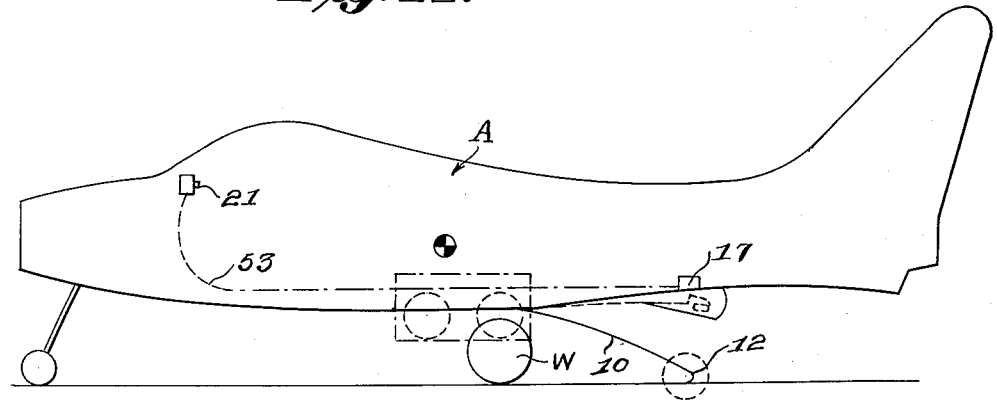
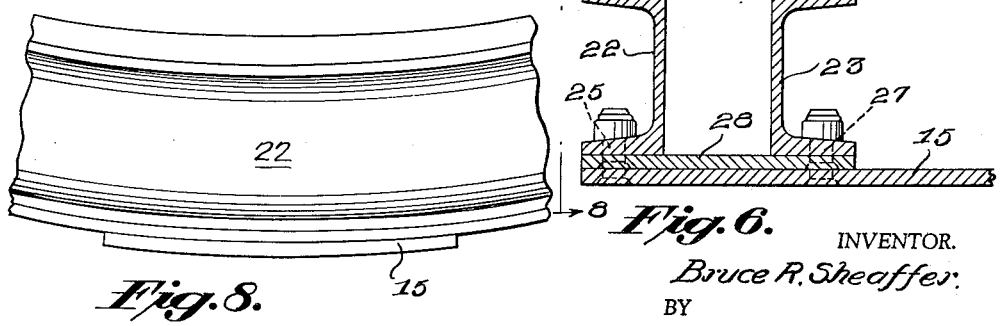

June 20, 1961  B. R. SHEAFFER  2,989,272
AIRCRAFT TAIL HOOK ASSEMBLY
Filed Nov. 19, 1958  5 Sheets-Sheet 3
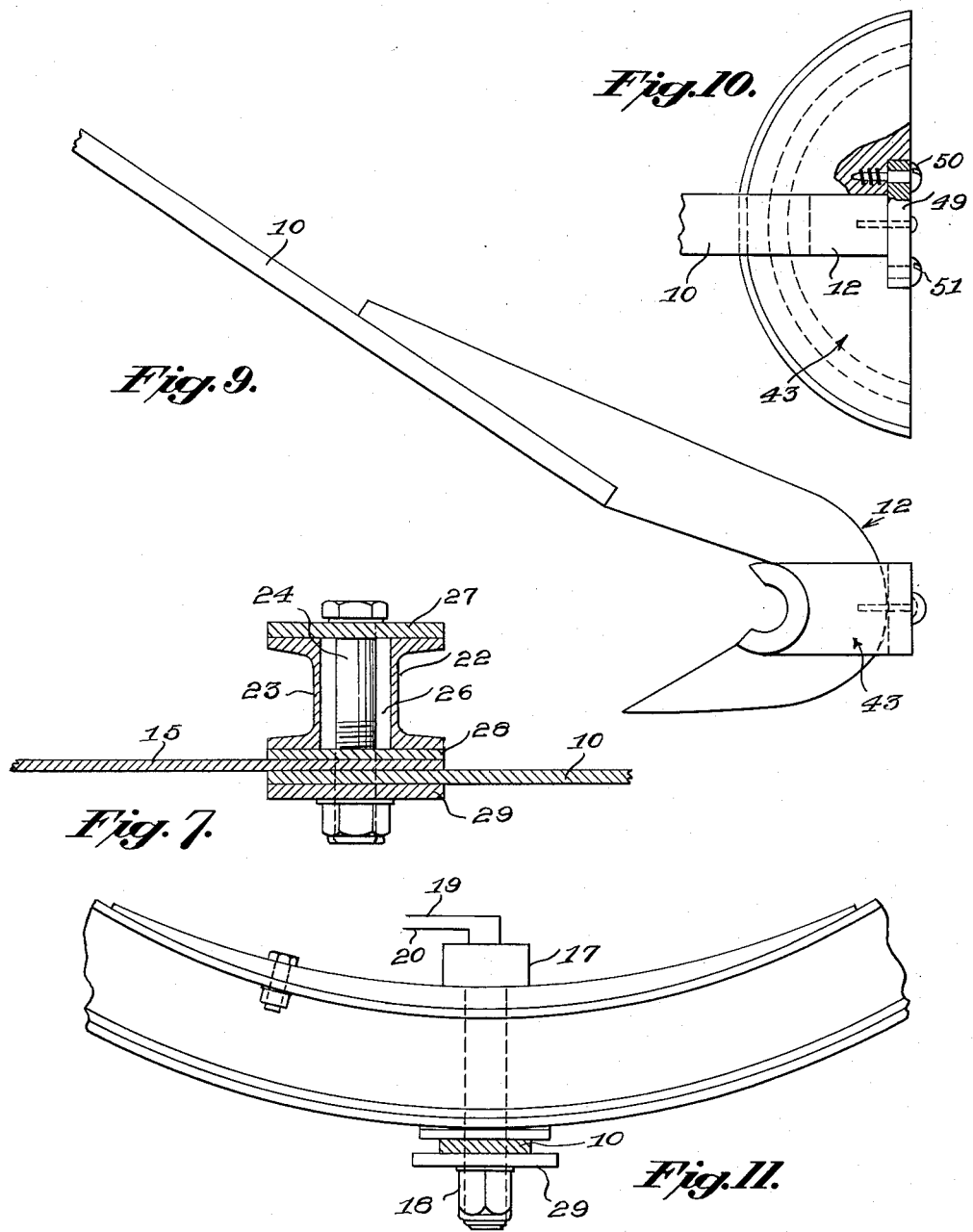
INVENTOR.
Bruce R. Sheaffer
BY
Herbert M. Birch

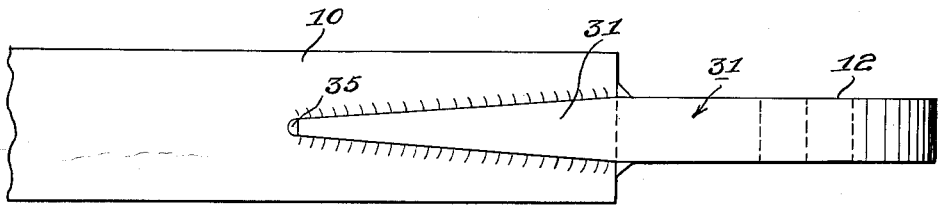
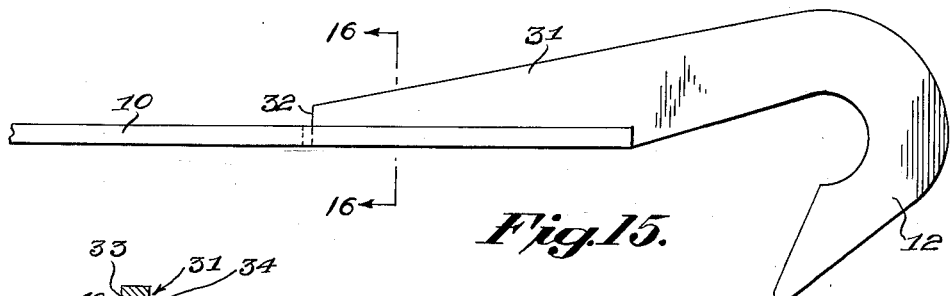
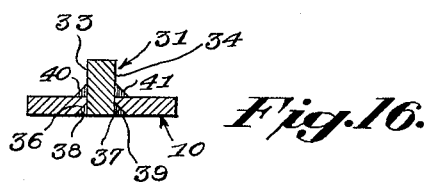
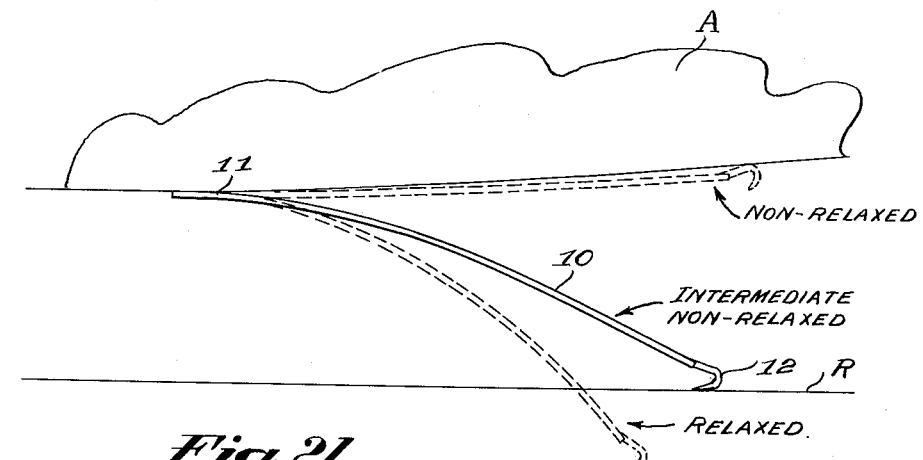
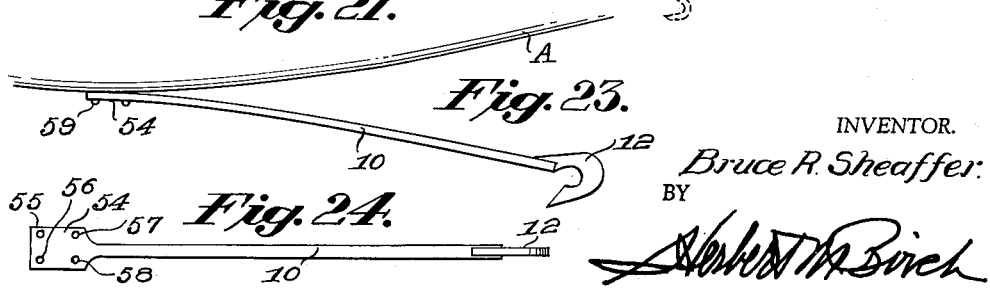
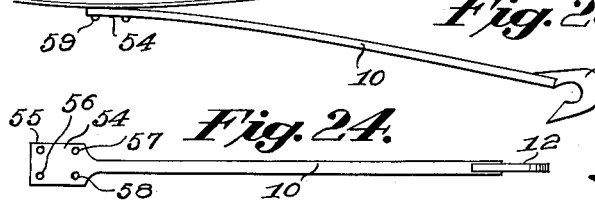

June 20, 1961   B. R. SHEAFFER   2,989,272
AIRCRAFT TAIL HOOK ASSEMBLY
Filed Nov. 19, 1958   5 Sheets-Sheet 5

INVENTOR.
Bruce R. Sheaffer.
BY
Herbert M. Birch

United States Patent Office 2,989,272
Patented June 20, 1961

2,989,272
AIRCRAFT TAIL HOOK ASSEMBLY
Bruce R. Sheaffer, Wilmington, Del., assignor to All American Engineering Company, Wilmington, Del., a corporation of Delaware
Filed Nov. 19, 1958, Ser. No. 774,885
7 Claims. (Cl. 244—110)

The present invention relates to means for arresting aircraft and more particularly to a novel emergency arresting hook assembly.

Prior arresting hooks for aircraft have been mounted on a rigid arm from the bottom of the fuselage and are usually hydraulically or mechanically operated by manually controlled linkage or cables to operative positions. These hooks and arm arrangements are slow operating and the fluid systems for operating the same are complex and subject to becoming out of order, with often disastrous results when an emergency landing and a short landing run out is critical to avoid a crash or an overrun.

It is an object of the present invention to provide a novel arresting hook, wherein all complex fluid systems are eliminated.

Another object is to provide an electric pilot control push-button release for a non-fluid operated arresting hook.

Still another object is to provide an tail hook mounted on a spring arm adapted when relaxed to extend a predetermined distance below the landing wheels of an aircraft on which the same is mounted, to thereby provide a hold down force on the hook to the runway when the aircraft wheels are on the same.

A further object is to provide a novel arrest cable detachable shoe adapted to be mounted in the bight of the tail hook, to thereby provide for smoother and more evenly distributed runway cable engagement during an arresting operation.

A further object is to provide a novel means and method of forming and connecting the respective free end of the spring arm and shank portion of the tail hook per se, to thereby permit lateral yieldable torque action between the tail hook and the said free end of the spring arm and thus maintain the hook in a vertical position from the runway surface.

Other objects and advantages of the invention will become apparent in the course of the following detailed description, wherein:

FIGURE 1 discloses the rear of an aircraft with the present novel arresting means retracted and secured in non-relaxed position under the belly of the aircraft fuselage;

FIGURE 2 is a rear view of the aircraft of FIGURE 1, illustrating the arresting means after it has been released to extended or non-retracted relaxed position;

FIGURE 3 illustrates the aircraft after touchdown with the runway and with the tail hook engaged with the arrest cable of a suitable arresting gear;

Figure 17:
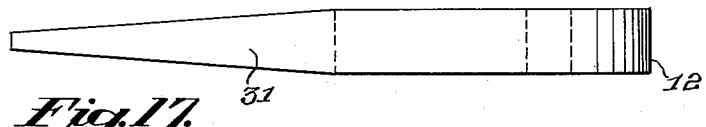
Figure 18:
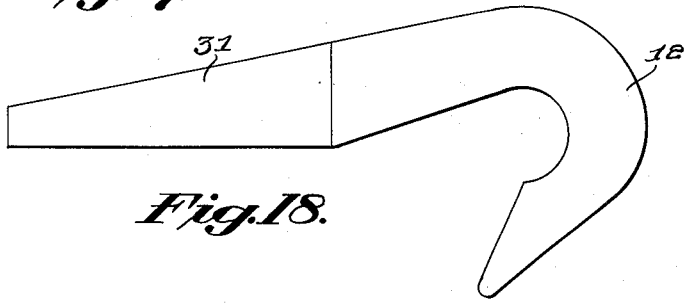
Figure 19:
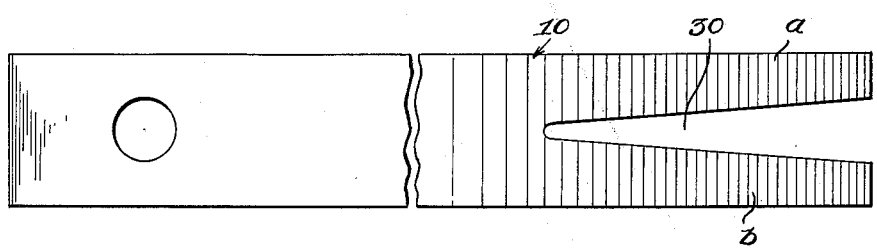
Figure 20:
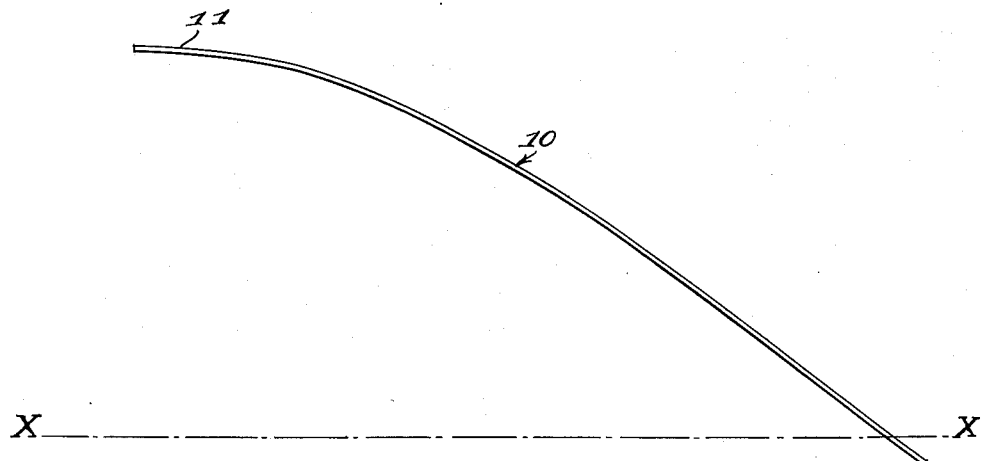

FIGURES 4 and 4a respectively disclose the novel securing and release means for the tail hook end of the arresting means spring arm with respect to the belly of an aircraft fuselage and showing the electrical conductor wires leading from the explosive cartridge or charge to a push-button electrical control located in the cockpit;

FIGURE 5 is a side view of an aircraft showing a mounting plate and connectors therefor under the aircraft's fuselage;

FIGURE 6 is a cross-sectional detailed view of the spring arm mounting plate, that is, the mounting bolts and fuselage frame structure for said plate at one end thereof;

FIGURE 7 is a cross-sectional detailed view of the plate, the mounting bolts, fuselage frame and cap plates, and a fragmentary portion of the spring arresting arm pivotally secured to the plate;

FIGURE 8 is a cross-sectional view taken along the line 8—8 of FIGURE 6 showing the flush fuselage conforming positions of the arresting arm mounting plate;

FIGURE 9 is a view of the tail hook and the free end of the arresting arm broken away from the portion thereof shown in FIGURE 7 as it extends from the mounting plate;

FIGURE 10 is a top plan view with a part thereof in cross-section of the tail hook and detachable shoe secured in the bight of the hook;

FIGURE 11 is a cross-sectional view of the aircraft cockpit and fuselage and the explosive nut and bolt arrangement for holding the tail hook up or in non-relaxed retracted position by engagement of the bolt through an opening in the spring arm adjacent the hook carrying end thereof, for threaded engagement into the nut installed on the inside of the fuselage frame;

FIGURE 12 is a side elevation view of one of the present novel tail hook shoes as it appears detached therefrom;

FIGURE 13 is a transverse sectional view taken on line 13—13 of FIGURE 12;

FIGURE 14 is a rear elevational view of the tail hook shank disclosing how it is secured to the free end of the flat spring arm;

FIGURE 15 is a side elevational view thereof;

FIGURE 16 is a sectional view taken on line 16—16 of FIGURE 15 disclosing the double weld connection of the tail hook shank to the forked free end of the spring arm;

FIGURE 17 is a rear edge view in elevation of the hook detached from the spring or hook arm;

FIGURE 18 is a side elevational view of the hook detached;

FIGURE 19 is a detail in front elevation of the spring hook arm showing the fuselage attaching bolt opening and the U-notched free end thereof for cooperative connection with the solid triangular shaped portion of the tail hook shank;

FIGURE 20 is a schematic or graphic representation of the calibrated or plotted bend of the spring or hook arm in its relaxed position, with the line X—X representing the aircraft runway surface and the relative aircraft wheel position of the free end of the said spring arm;

FIGURE 21 is a side elevational view of a part of an aircraft fuselage, a runway and an illustration of the relaxed position of the tail hook and spring arm therefor in dotted lines, with the non-relaxed runway engaging position of the hook and spring arm therefor in solid line after the same has been released from non-relaxed retracted position against the fuselage belly;

FIGURE 22 shows another form of release cartridge, wherein the bolt is made explosive instead of the nut secured to the fuselage frame; and FIGURE 23 is a side elevational view of a simplified mounting for an arrest hook and spring arm, wherein the hook and arm are not free to pivot about the fuselage attachment;

FIGURE 24 is a front elevational view of the arrangement of FIGURE 23.

Referring in detail to the drawings and first with particular reference to FIGURES 1, 2, and 3, which disclose the present novel arresting hook assembly as it appears when mounted on the belly or exterior underside of the fuselage of an aircraft in its various positions of use. For example, in FIGURE 1, there is shown an aircraft A with the present novel arresting means B in retracted and non-relaxed position against the underside of the fuselage; in FIGURE 2, the arresting means B is shown in unretracted or extended relaxed position after it has been released by the pilot for the actual arrest operation; and in FIGURE 3 is shown an arresting cable C and a portion of the arresting gear D adjacent a runway R. The arresting gear D may be of the type shown in Patent No. 2,731,219, issued January 17, 1956, to Robert C. Cotton, and assigned by mesne assignments to the assignee of the present invention.

The arresting means B comprises a tempered leaf spring arm 10 plotted on a predetermined curve, see FIGURE 20, and secured at one end 11 to the underside of an aircraft fuselage with a tail hook or an arresting hook 12 secured to the free end of the arm 10.

The spring arm 10 is formed with fastener openings 13 and 14 adjacent each end thereof. Opening 13 provides for pivotally securing the end 11 of the arm to a mounting plate 15, see FIGURES 6, 7, and 8, secured to the underside of the fuselage and opening 14 provides for releasably securing the tail hook end 12 of the arm to the underside fuselage in a non-relaxed straightened out position thereof against the action of the leaf spring's normal downwardly curved relaxed position. The spring arm 10 may be of stainless steel and is made with a strong spring resistance with respect to the retracted or non-relaxed substantially straight position thereof against the underside of the aircraft. As shown in FIGURE 4, the same is manually retracted to non-relaxed or loaded position by forcing the free end of the arm 10 upward until the opening 14 is aligned with the opening 15 in the fuselage frame and bore 16 of a nut 17, and then securing the same by means of a fastener, such as the bolt 18.

The nut 17 is partially charged with a suitable explosive in contact with an electric igniting filament, not shown, which filament connects by leads 19 and 20 from a conductor cable 53 to a push-button switch 21, suitably connected in the electric power circuit of the aircraft, see FIGURES 4a and 5. Thus, when the push-button is actuated to close the switch, the filament becomes heated to explode the charge and disintegrate the nut 17, to thereby release the spring arm 10 from retracted non-relaxed position to non-retracted relaxed position, as shown in FIGURES 2 and 3.

Since the release of the spring arm 10 to relaxed position is with some considerable downward force, it is important to securely mount the anchored end of the arm to the underside of the fuselage in such a manner as to not apply excessive strain on the aircraft fuselage shell and frame structure following the arm release action. Accordingly, the mounting plate 15 is provided and is secured at end 11 of the arm 10 to the aircraft frame comprising a connecting bolt 24 extending between two spaced back-to-back C channels 22 and 23 with cap or end plates 27 and 28, see FIGURE 7. The other end of plate 15 is secured by bolts 25 and 27 to the fuselage C channels 22 and 23, see FIGURE 6. The arm 10 is secured to the plate 15 by the bolt 24 and the end cap plates 27 and 28, and washer 29, see FIGURE 7 of the drawings.

The leaf spring arm 10 at its free end is made lighter in weight by forming the same with a U-notch 30, thus providing a forked tongue-like end having tines a and b to which the shank 31 of the arresting hook 12 is double welded, as shown in FIGURE 16. The shank 31 is formed of solid triangular shape with the apex removed or cut off to leave a flat tip 32 so that the sides 33 and 34 thereof fit snugly in engaging contact with the opposed side edges of the free end of the arm 10, which define the U-notch 30, and the flat tip 32 thereby leaves the apex of the notch free to provide an opening 35. The edges of the U-notch 30 are chamfered on opposed edges 36 and 37 from one face of the arm 10, to thereby provide a countersunk pocket to receive weld seams 38 and 39 along the respective contacting side portions of the hook shank 31; and whereby second weld seams 40 and 41 superimposed with respect to weld seams 38 and 39, respectively, are formed along the sides of the hook shank 31 and the opposite face of the arm 10 along the sides thereof defining the notch 30 on said respective opposite faces of the arm.

The hook 12 has an arrest hook shoe 43 detachably mounted in the bight thereof, see FIGURE 10. The shoe comprises a block of material reasonably resistant to any heat developed from frictional contacts at high speeds with the landing surface and is formed with an arcuate groove 44 at the front edge thereof facing the shank 31 of the hook and transverse of the same. The rear edge of the shoe is formed with a centrally positioned recess 45 to receive the thickness of the hook 12 at the rear edge thereof. The recess 45 is counter-cut to form a shoulder 46 with threaded bolt openings 47 and 48 for attachment of the shoe to the hook 12 by a plate 49 formed with bolt openings for the bolts 50 and 51 adapted to register with the said shoulder openings, see FIGURES 10 and 12. With this arrangement, it is very simple to replace the hook shoes when they become worn from use.

Another form of electrically fired release means is disclosed in Figure 22, wherein there is disclosed a frame supported nut 17 and an explosive bolt 52, which when placed through the opening 14 in the spring arm 10 and threaded in the bore 16 of the nut 17 secures the arm 10 snugly against the belly of the aircraft fuselage. The cable 53 with leads 19 and 20 to the shell of the bolt 52 and an ignition wire, not shown, in contact with the explosive charge inside the bolt is connected in circuit with the push-button switch 21 in the cockpit of the aircraft, see Figures 5 and 22.

In Figures 20 and 21, the leaf spring arm 10 is shown first as it is plotted on a predetermined curve based on the distance that the tail hook 12 should extend when the arm is relaxed or in non-retracted position to provide a desired runway engaging holddown force. For example, this distance is calibrated or plotted so that as shown in Figure 21 in dotted position, the tail hook extends below the circumferential peripheral surface of the aircraft wheels W and the fuselage of the craft. Thus, when a touchdown of the wheels W with the runway R is made, the arm 10 is forced upward toward the fuselage from its maximum relaxed position to an intermediate non-relaxed position by engagement with the runway surface. This causes the hook 12 to be held on the runway by a downward force.

The bend of the spring arm shown in Figure 20 starts from point 11, which is the point of connection of the spring arm 10 to the fuselage and by suitable calibrations the bend or curve is plotted so the hook attachable end thereof extends a predetermined distance below the base line X—X representative of the lowermost portion of the aircraft landing wheels.

Figures 23 and 24 show another means to secure the hook arm 10 to the fuselage of the aircraft by a plate 54 formed with four fastener openings 55, 56, 57, and 58, for fasteners such as bolts 59. The arm 10 thus fastened is very secure and obviously cannot pivot laterally as when secured by the single bolt 24 of the first embodiment.

*Operation*

In operation, for example, as an aircraft is approaching for landing, the pilot pushes the button 21 and fires the cartridge nut or bolt, thereby releasing the tail hook end of the stainless steel spring arm 10 from the non-relaxed position thereof against the belly of the fuselage, and the tail hook 12 secured thereto, to the relaxed position thereof, see Figures 2 and 21. Then, as the aircraft wheels W engage the runway R, the tail hook 12 is deflected and forced upward thereby to an intermediate non-relaxed position, and as the aircraft runs forward with its wheels on the runway, the hook 12 engages the arrest cable C and is brought to a stop by the arresting gear D as shown in Figure 3.

Without further description, it is believed that the present invention is clearly understandable to others authorized to practice the same. While the invention is described and illustrated in detail for substantially only one form of leaf spring arm and tail hook, it is to be expressly understood that other forms of spring arms, modification and arrangements of the parts are to be considered a part hereof. To determine the scope of the present invention, reference should be had to the appended claims.

What is claimed is:

1. A tail hook assembly comprising a flat spring arm, said arm being formed with a U-notch in an end thereof, the edge of said notch being chamfered on one side of the arm, a hook formed with a shank end and a hook end, said shank end being so shaped and so proportioned as to fit in the said notch in the end of said spring arm to a point free of the apex of said arm notch, and said shank having a portion with flat sides at substantially right angles to the flat face of the said spring arm extending into the notch adjacent the said chamfered edges and a portion extending beyond the opposite side edges of the arm notch, and a double welded joint formed between the chamfered edges of the notch and the hook shank and the opposite side edges of the said arm notch.

2. An aircraft arresting assembly comprising an arm having securing means at one end for securing it to the underside of an aircraft fuselage, the arm being formed of a spring bow so that, when secured to an aircraft fuselage at said one end it will extend downwards, a hook at the end remote from the securing means, and connecting means for connecting the hook end to the aircraft fuselage.

3. An aircraft arresting means as claimed in claim 2 wherein the connecting means includes means for disconnecting the hook end of the arm by remote control.

4. An aircraft having an arresting assembly as claimed in claim 2 wherein the arm is retained by the securing and connecting means, in conformity with the contour of the underside of the aircraft fuselage.

5. An aircraft as claimed in claim 2 wherein the connecting means comprises a bolt accommodated in the arm and threadably mounted in an aligned bushing in the underside of the aircraft fuselage, the bushing being loaded with an explosive charge, electrical detonating means connected to said charge, and a pushing button electrical control in the aircraft for actuating said detonating means.

6. An aircraft as claimed in claim 2, wherein the connecting means comprises an explosive bolt having a shank secured in the fuselage and accommodated in an aligned hole in the arm, the arm being held in a non-relaxed position in conformity with the contour of the fuselage by a nut secured onto the end of the bolt shank, and electrical detonating means attached to the bolt, whereby it may be detonated by a push button electrical control in the aircraft to release the arm.

7. An aircraft as claimed in claim 2, wherein the hook end of the arm, when the arm is in the relaxed non-connected position, extends below the base line of the aircraft wheels, so that when the aircraft is on a plane surface the arm is forced upwards into an intermediate non-relaxed position, thus providing an engaging force between the hook and the said plane surface.

References Cited in the file of this patent

UNITED STATES PATENTS

| | | |
|---|---|---|
| 1,893,591 | Minshall | Jan. 10, 1933 |
| 2,526,711 | Thomas | Oct. 24, 1950 |
| 2,602,613 | Turner | July 8, 1952 |
| 2,668,031 | Martin et al. | Feb. 2, 1954 |
| 2,696,957 | Brown | Dec. 14, 1954 |
| 2,780,961 | Musser et al. | Feb. 12, 1957 |

FOREIGN PATENTS

| | | |
|---|---|---|
| 427,820 | France | June 7, 1911 |